May 29, 1934.  D. B. ROBISON  1,960,877
TELEPHONE SYSTEM
Filed June 9, 1930
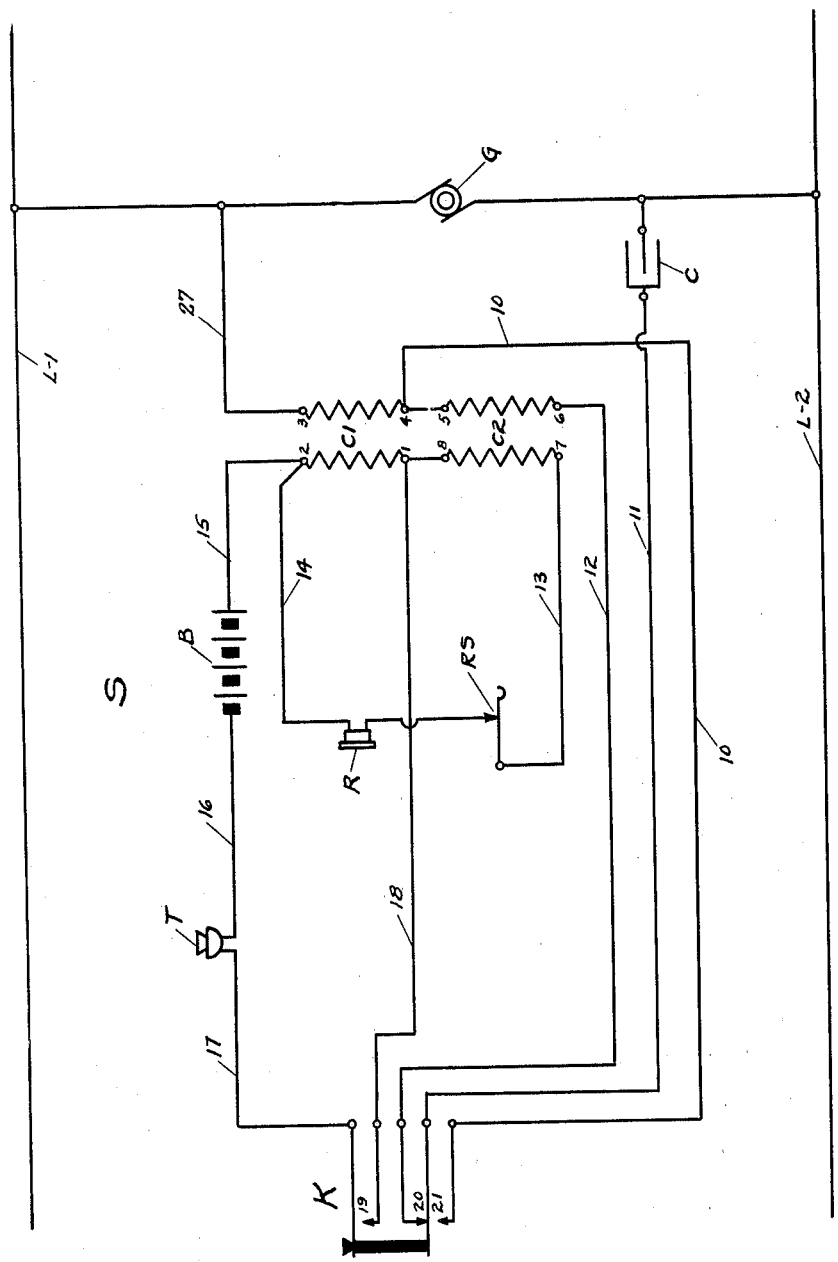
Inventor
Daniel B. Robison
By C.P.Soper
Attorney Patented May 29, 1934

1,960,877

UNITED STATES PATENT OFFICE 1,960,877

TELEPHONE SYSTEM

Daniel B. Robison, Cicero, Ill., assignor to Kellogg Switchboard and Supply Company, Chicago, Ill., a corporation of Illinois Application June 9, 1930, Serial No. 459,853

3 Claims. (Cl. 179—28)

My invention relates to telephone systems and more particularly to train dispatching and similar system having a non-loaded copper metallic open wire circuit and having a number of stations bridged across a common line.

In the present disclosure a key is provided at each of the stations on the line which, when in its normal position, opens the battery circuit to prevent flow of current when the telephone is not in use and to complete the circuit for a line winding of the induction coil. When the key is operated it closes a series circuit through the receiver and battery and also acts to short circuit one of the line windings of the induction coil.

An object of my invention is to increase the transmission efficiency in a telephone system of this type.

A further object of my invention is to provide a system in which the flow of battery current through the receiver is so reduced as to have practically no detrimental effect on the receiver thus lengthening its term of efficiency.

It is believed that the further disclosure of the invention will be understood most readily from a detailed description thereof taken in connection with the accompanying drawing which shows in schematic form the circuit used in the invention.

Referring now to the drawing, L' and L² are the two sides of the telephone line, which may be of any desired length. S is one of several stations bridged across the line. Induction coils C' and C², a battery B, a transmitter T, a receiver R, a receiver switch RS, a condenser C and a generator or other source of ringing current G may all be of types which are well known in the art. The key K which, when in its normal position opens the local battery circuit, is connected in a manner which will be disclosed by a detailed explanation of the operation of the circuit.

When the party at station S wishes to listen, he closes the switch RS, which may be a hook switch operating in connection with the receiver. This closes a circuit through the switch RS, receiver R, lead 14, windings 2—1 of induction coil C', winding 8—7 of induction coil C² in series and lead 13. Conversation is induced into this circuit through line L', lead 27, winding 3—4 of the induction coil C', winding 5—6 of the induction coil C², lead 12, normal contact 20 of the key K, lead 11, condenser C and line L², as is well understood in the art.

When the party at station S wishes to talk, he presses the key K thereby closing contacts 19 and 21 and opening contact 20. The closing of contact 19 completes a circuit from battery B through lead 16, transmitter T, lead 17, alternate contact 19, lead 18, winding 1—2 of the induction coil C', and lead 15 to battery. The opening of contact 20 disconnects the winding 5—6 of the induction coil C² from the circuit and the closing of the contact 21 joins the inner end of coil 4—3 to conductor L² by a circuit traced from L² through condenser C, lead 11, alternate contact 21, lead 10, to winding 4—3 of the induction coil C' and thence through lead 27 to conductor L'.

Due to the receiver R being in series with the winding 7—8 of induction coil C² the flow of current from battery B through the receiver is very greatly reduced. When, however, the key K is actuated the receiver is in inductive relation to the line circuit through the medium of the windings of the induction coil C' so the party at the station S can hear the response of the party with whom he is talking. This provision is to permit a person at another station on the line to interrupt the party talking at station S without waiting for the latter party to release the key K.

It will be noted that when the party at the station S is listening, key K will be in its normal position so that both induction coils C' and C² will be effective. When, however, the party at station S is talking the key K will be depressed and only coil C' will be effective as the circuit of the winding 5—6 of the coil C² will be open at the contact 20 of key K.

It will be noted that in the circuit herein provided at no time is the winding of receiver R subject to undue flow of current and that when the instrument is not in use no current whatever flows through the receiver. This provision insures a greater term of efficiency of the receiver without deterioration.

While I have illustrated a preferred form of my invention it is to be understood that I do not wish to be limited thereto, as changes and modifications will readily suggest themselves without departing from the spirit and scope of the appended claims.

Having described my invention, what I claim as new and desire to secure by United States Letters Patent is:

1. In a telephone system a pair of line conductors, a transformer winding, means normally including said winding in a bridge of said conductors, a second transformer winding in inductive relation to said first mentioned winding, a receiver, means for including said receiver in series with said second winding, a transmitter, a battery, and switching means for including said transmitter and battery in series with a portion of said second winding said receiver remaining in series with all of said second transformer winding.

2. In a telephone system, a pair of line conductors, a transformer winding, means normally including said winding in a bridge of said conductors, a second transformer winding in cooperative relation to said first mentioned winding, a receiver, means for including said receiver in series with said second winding, a transmitter, a battery, and switching means for including said transmitter and battery in series with a portion of said second winding, said receiver remaining in series with all of said transformer winding, said switching means acting to short circuit a portion of said first mentioned winding.

3. In a telephone system, a pair of line conductors, a transformer winding, means normally including said winding in a bridge of said conductors, a second transformer winding in cooperative relation to said first mentioned winding, a receiver, a hook switch for including said receiver in series with said second winding, a transmitter, a battery, and key operated contacts, one contact acting to include said transmitter and battery in series with a portion of said second winding, said receiver remaining in series with all of said second transformer winding, and another contact acting to short circuit a portion of said first mentioned winding.

DANIEL B. ROBISON.